US010415879B2

(12) United States Patent
Costa De Beauregard et al.

(10) Patent No.: US 10,415,879 B2
(45) Date of Patent: Sep. 17, 2019

(54) PROCESS FOR PURIFYING NATURAL GAS AND LIQUEFYING CARBON DIOXIDE

(71) Applicant: L'Air Liquide, Société Anonyme pour l'Etude et l'Exploitation des Procédés Georges Claude, Paris (FR)

(72) Inventors: Pierre Costa De Beauregard, Issy les Moulineaux (FR); Michele Murino, Champigny sur Marne (FR); Delphine Pichot, Paris (FR)

(73) Assignee: L'Air Liquide, Société Anonyme pour l'Etude et l'Exploitation des Procédés Georges Claude, Paris (FR)

(*) Notice: Subject to any disclaimer, the term of this patent is extended or adjusted under 35 U.S.C. 154(b) by 162 days.

(21) Appl. No.: 15/611,356

(22) Filed: Jun. 1, 2017

(65) Prior Publication Data
US 2017/0350646 A1 Dec. 7, 2017

(30) Foreign Application Priority Data

Jun. 2, 2016 (FR) ..................... 16 54995

(51) Int. Cl.
F25J 1/00 (2006.01)
C10L 3/10 (2006.01)
(Continued)

(52) U.S. Cl.
CPC ............ *F25J 1/0022* (2013.01); *C10L 3/102* (2013.01); *F25J 1/0027* (2013.01); *F25J 1/0037* (2013.01);
(Continued)

(58) Field of Classification Search
CPC ............... F25J 1/0022; F25J 1/0027; F25J 1/0211–0214; F25J 3/0209; F25J 3/0266
See application file for complete search history.

(56) References Cited

U.S. PATENT DOCUMENTS 3,702,063 A    11/1972  Etzbach et al.
2004/0255616 A1 12/2004  Mauder et al.
(Continued)

FOREIGN PATENT DOCUMENTS

WO    WO 2015 098124    7/2015

OTHER PUBLICATIONS

French Search Report for corresponding FR 1654995, dated Jan. 27, 2017.

*Primary Examiner* — Tareq Alosh
(74) *Attorney, Agent, or Firm* — Elwood L. Haynes; Justin K. Murray

(57) ABSTRACT

A process for producing liquefied natural gas and liquid carbon dioxide from a natural gas feed gas comprising at least the following steps: Separation of a natural gas feed gas into a $CO_2$-enriched gas stream and a natural gas stream; Cooling of said natural gas in a heat exchanger; Purification of the in step 1 from compounds containing at least six carbon atoms; At least partial condensation of said gas stream resulting from step 3 to form a two-phase stream; Separation of said two-phase stream resulting from step 4 to form a gas stream and a liquid stream; Condensation of the gas stream resulting from step 5 to form a liquefied gas containing less than 5 ppm by volume of compounds containing at least six carbon atoms; Liquefaction of the $CO_2$-enriched gas stream resulting from step 1 with a portion of the liquid stream resulting from step 5.

10 Claims, 1 Drawing Sheet

(51) Int. Cl.
*F25J 3/02* (2006.01)
*F25J 1/02* (2006.01)
*F25J 3/08* (2006.01)

(52) U.S. Cl.
CPC ........... *F25J 1/0045* (2013.01); *F25J 1/0055* (2013.01); *F25J 1/0212* (2013.01); *F25J 1/0237* (2013.01); *F25J 1/0238* (2013.01); *F25J 1/0283* (2013.01); *F25J 1/0285* (2013.01); *F25J 3/0209* (2013.01); *F25J 3/0233* (2013.01); *F25J 3/0242* (2013.01); *F25J 3/0247* (2013.01); *F25J 3/0266* (2013.01); *F25J 3/08* (2013.01); *F25J 2200/02* (2013.01); *F25J 2200/74* (2013.01); *F25J 2210/06* (2013.01); *F25J 2215/04* (2013.01); *F25J 2220/60* (2013.01); *F25J 2220/64* (2013.01); *F25J 2220/66* (2013.01); *F25J 2220/82* (2013.01); *F25J 2245/02* (2013.01); *F25J 2260/20* (2013.01); *F25J 2270/18* (2013.01); *F25J 2270/66* (2013.01); *F25J 2290/12* (2013.01); *Y02C 10/12* (2013.01)

(56) References Cited

U.S. PATENT DOCUMENTS

| | | |
|---|---|---|
| 2011/0126451 A1 | 6/2011 | Pan et al. |
| 2011/0174016 A1 | 7/2011 | Carnell et al. |
| 2016/0313056 A1 | 10/2016 | Kikkawa et al. |

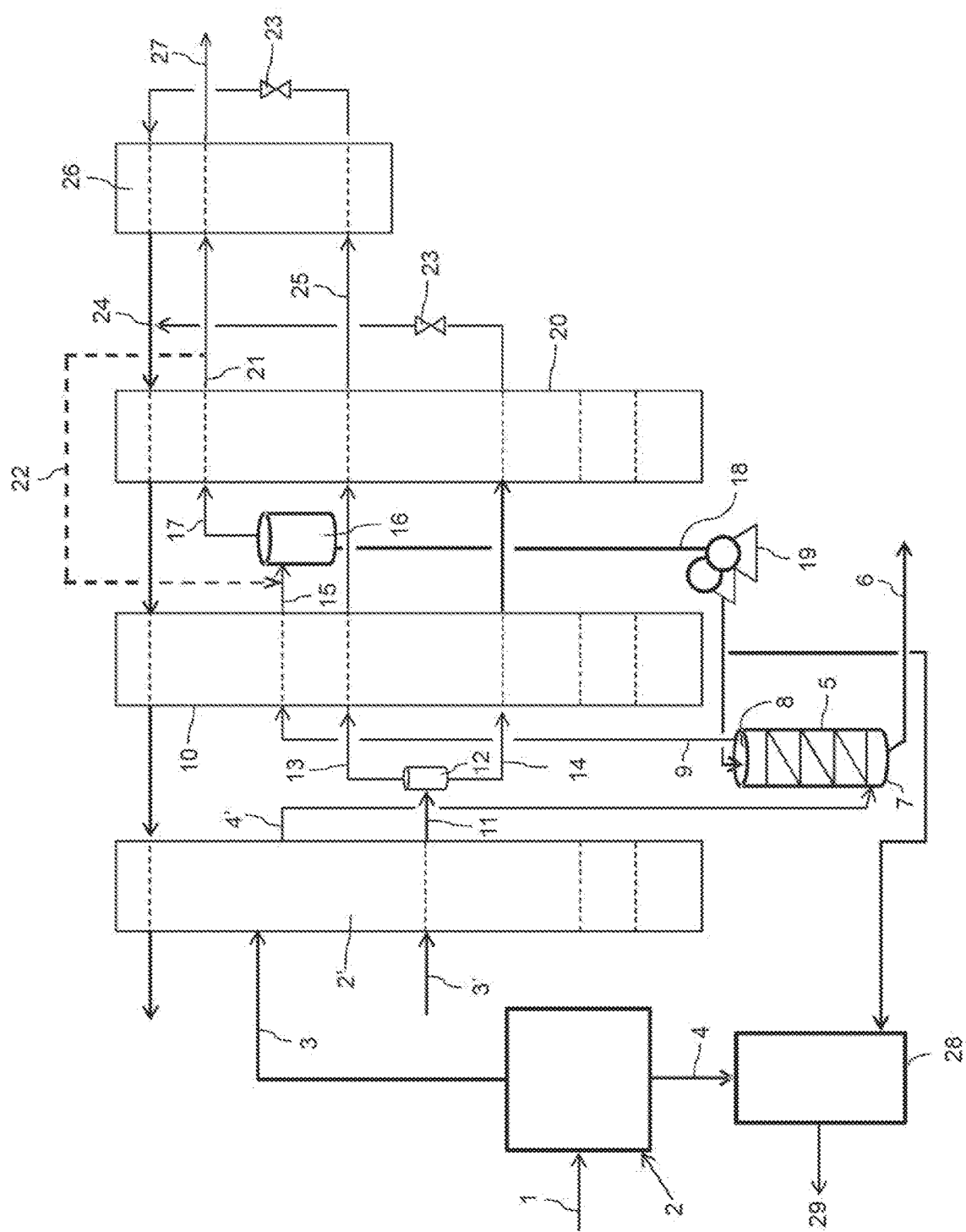

PROCESS FOR PURIFYING NATURAL GAS AND LIQUEFYING CARBON DIOXIDE

CROSS REFERENCE TO RELATED APPLICATIONS

This application claims the benefit of priority under 35 U.S.C. § 119 (a) and (b) to French Patent Application No. 1654995 filed Jun. 2, 2016, the entire contents of which are incorporated herein by reference.

BACKGROUND

The present invention relates to a process for liquefying a stream of hydrocarbons such as natural gas, in particular in a process for producing liquefied natural gas and liquid $CO_2$.

In typical natural gas liquefaction plants, refrigerants streams are used to produce the refrigeration at various levels of a main heat exchanger by vaporizing against the stream of hydrocarbons to be liquefied (typically natural gas).

It is desirable to liquefy natural gas for a certain number of reasons. By way of example, natural gas may be stored and transported over long distances more easily in the liquid state than in the gas form, since it occupies a much smaller volume for a given mass and does not need to be stored at a high pressure.

Typically, natural gas contains hydrocarbons and $CO_2$ (0.5 mol % to 5 mol % approximately). In order to prevent the $CO_2$ from freezing during the liquefaction of the natural gas, it is advisable to remove it. One means for removing the $CO_2$ from the natural gas stream is for example amine scrubbing upstream of a liquefaction cycle.

Amine scrubbing separates the $CO_2$ from the feed gas by scrubbing the natural gas stream with a solution of amines in an absorption column. The $CO_2$-enriched amine solution is recovered at the bottom of this absorption column and is regenerated at low pressure in a distillation (or stripping) column. At the top of this distillation column, a $CO_2$-rich acid gas is released. Thus the amine scrubbing treatment of the natural gas stream releases a $CO_2$-concentrated "acid gas" stream, usually emitted directly into the atmosphere.

In natural gas liquefiers (50 000 tonnes per year to 10 million tonnes per year) the amount of $CO_2$ emitted is sufficient (amount of $CO_2$ emitted possibly ranging up to 200 tonnes per day) and it is possible to purify this $CO_2$-rich "acid gas" to give food grade $CO_2$.

Specifically, in the food field, in accordance with the current legislation, in order to be able to be sold, the $CO_2$ produced must meet strict specifications in terms of quality and purity. Thus, for example, any trace of hydrocarbons or of sulphur derivatives must be eliminated (content typically less than 1 ppm by volume).

This purification is carried out by means of a dedicated $CO_2$ purification unit requiring the installation of a dedicated refrigeration cycle (typically a refrigeration system operating with ammonia for example).

The operation of the "refrigeration unit" refrigeration cycle consists in providing the refrigeration necessary for the $CO_2$ purification/liquefaction process.

Typically, a standard $CO_2$ unit contains the following steps:

Step 1: Compression of the impure $CO_2$ to a pressure between 15 and 50 bar abs.

Step 2: Purification of the $CO_2$ for example by processes that use regenerative adsorbents, absorbents or catalyst to eliminate any presence of water, mercury, hydrocarbons and sulphur derivatives (non-exhaustive list of impurities).

Step 3: Distillation of the noncondensable gases in order to separate in particular oxygen and nitrogen from the $CO_2$ produced.

Thus, conventionally in a $CO_2$ purification/liquefaction unit, it is necessary to provide refrigeration at three temperature levels:

1. Refrigeration at −20° C./−30° C. used for step 3 described in the paragraph above.
2. Refrigeration at 5° C. used for step 2.
3. Refrigeration at ambient temperature for cooling the impure $CO_2$ in step 1.

The condenser of the distillation column used in step 3 represents around 50% of the total of the refrigeration requirements. This refrigeration may be provided via a dedicated refrigeration cycle (typically an ammonia or propane refrigeration cycle) optionally coupled with a water cooling system.

The system for producing frigories represents a high cost of the $CO_2$ purification and liquefaction unit and adds complexity of implementation to the site for implemention of the process which represents a constraint.

SUMMARY

The present invention relates in particular to a process of thermal integration between a natural gas liquefaction unit and $CO_2$ purification/liquefaction unit.

One existing solution consists in separating the two (natural gas liquefaction and $CO_2$ purification) units which requires the installation of two systems for producing frigories, one for the natural gas liquefaction unit and one for the $CO_2$ purification unit.

The inventors of the present invention have thus developed a solution that makes it possible to solve the problem raised above, namely to minimize the investment in a system for producing frigories in the $CO_2$ purification/liquefaction unit and therefore to optimize the investment expenditure while retaining an optimal efficiency for the liquefaction of the natural gas in the liquefaction unit.

In addition, the natural gas typically contains "heavy" hydrocarbons and aromatic derivatives. Heavy hydrocarbons are understood to mean hydrocarbons having more than four carbon atoms, including in particular hydrocarbons having more than six carbon atoms. The aromatic derivatives are cyclic compounds such as benzene, xylene or toluene for example.

In order to prevent the certain heavy hydrocarbons and aromatic derivatives such as benzene for example from freezing during the liquefaction of the natural gas, it is advisable to remove them at a high enough temperature to avoid any risk of formation of solids.

One existing solution is to send the "hot" natural gas (i.e. before entry into a liquefaction exchanger) into a scrubbing column where it is scrubbed and stripped of its heavy constituents including benzene. The gas stream leaving the top of this column, purified from heavy compounds, is then sent to a liquefaction exchanger where it condenses. An intermediate outlet in the exchanger makes it possible to recover a liquid flow resulting from the partial condensation of the natural gas, and is used to produce the reflux at the top of the column.

The drawback of this solution is that the scrubbing of a column at ambient temperature with a cryogenic liquid, furthermore at thermodynamic equilibrium as typically resulting from a partial condensation vessel, leads to a very high instantaneous vaporization that reflects a poor thermal integration of the system and therefore a low effectiveness.

Furthermore, the composition and the operating conditions of the natural gas to be treated may change over the lifetime of the unit and the liquid reflux at the top of the column may not be sufficient if it depends only on a partial condensation.

The invention proposes to solve the problems described above linked to the abatement of the heavy hydrocarbons and of the aromatic derivatives, in particular benzene, present in the natural gas.

The subject of the present invention is a process for producing liquefied natural gas and liquid carbon dioxide ($CO_2$) from a natural gas feed gas that contains carbon dioxide and that is rich in hydrocarbons comprising at least 10 ppm by mole of hydrocarbons having at least six carbon atoms, comprising at least the following steps:

Step a): Separation of a natural gas feed gas, containing hydrocarbons and carbon dioxide in a treatment unit, into a $CO_2$-enriched gas stream and a natural gas stream;

Step b): Cooling of said natural gas to a temperature between −20° C. and −60° C. by heat exchange with at least one refrigerant in a heat exchanger;

Step c): Purification of the gas partially liquefied in step a) from compounds containing at least six carbon atoms in a scrubbing column containing a top of the column in its highest end and a bottom of the column in its lowest end in order to form, at the top of the scrubbing column, a gas stream containing less than 5 ppm by volume of compounds containing at least six carbon atoms, and, at the bottom of the scrubbing column, a liquid stream enriched in compounds containing at least five carbon atoms;

Step d): At least partial condensation of said gas stream resulting from step c) in a heat exchanger in order to form a two-phase stream;

Step e): Separation of said two-phase stream resulting from step d) in a phase separator vessel at a temperature between −60° C. and −80° C. in order to form a gas stream at the top of the vessel and a liquid stream at the bottom of the vessel;

Step f): Optional use of a first portion of the liquid stream resulting from step e) as reflux at the top of the scrubbing column;

Step g): Condensation of the gas stream resulting from step e) by heat exchange in a heat exchanger at a temperature below −100° C. in order to form a liquefied gas containing less than 5 ppm by volume of compounds containing at least six carbon atoms;

Step h): Liquefaction of the $CO_2$-enriched gas stream resulting from step a) by heat exchange with a second portion of the liquid stream resulting from step e).

The object of the present invention is to thermally couple a unit for liquefying a gas rich in hydrocarbons, typically natural gas, with a unit for purifying/liquefying $CO_2$.

Thermal coupling is understood to mean sharing the means for producing frigories in order to ensure the thermal balance of the two units, typically refrigeration cycle compressor, and optionally a turbine/booster system in the case of nitrogen cycles.

A turbine/booster system is understood to mean a turbine mechanically coupled (via a common shaft) to a single-stage compressor, the power generated through the turbine being directly transmitted to the single-stage compressor.

This thermal integration is realized by the sharing of any column, heat exchanger, unit or other suitable arrangement (typically a heat exchanger) where streams linked to the natural gas liquefaction process and streams linked to the $CO_2$ purification/liquefaction process exchange thermally.

The process that is the subject of the present invention makes it possible to do without the refrigeration unit initially necessary for liquefying the $CO_2$ and to extract the refrigeration directly from the natural gas liquefier. This thermal integration thus makes it possible to do without one piece of equipment in the $CO_2$ purification unit.

The proposed integration makes it possible to provide refrigeration at the three temperature levels needed.

According to other embodiments, the invention also relates to:

A process as defined above, characterized in that the feed gas comprises from 0.1 mol % to 5 mol % of $CO_2$.

A process as defined above, characterized in that the gas stream resulting from step c) and the liquefied natural gas resulting from step d) contain less than 1 ppm by mole of compounds containing at least six carbon atoms.

A process as defined above, characterized in that the $CO_2$-enriched gas stream resulting from step a) comprises at least 95 mol % of $CO_2$.

A process as defined above, characterized in that said treatment unit used in step a) is an amine scrubbing unit.

A process as defined above, characterized in that said hydrocarbons having at least six carbon atoms comprise a majority of benzene.

A process as defined above, characterized in that the operating temperature of step b) is between −20° C. and −40° C.

A process as defined above, characterized in that the second portion of the liquid stream resulting from step e), having been used to liquefy the $CO_2$-enriched stream during step g), is then reinjected into the bottom of the scrubbing column.

Since the refrigeration requirement of a natural gas liquefaction unit is generally greater than the refrigeration requirement of a $CO_2$ purification/liquefaction unit, it is relevant to benefit from the available capacity of the machines (compressors and/or turbine/boosters) of the natural gas liquefaction unit in order to at least partially provide the refrigeration requirement of the $CO_2$ purification/liquefaction unit and in particular to limit the investment in machinery of the $CO_2$ purification/liquefaction unit.

In particular, the incremental investment for increasing the liquefaction capacity of a hydrocarbon liquefier is much lower than the incremental investment for increasing the liquid production capacity of a $CO_2$ purification/liquefaction unit.

Moreover, other intermediate treatment steps between the hydrocarbon stream/$CO_2$ separation and the liquefaction of the hydrocarbons may be carried out. The stream of hydrocarbons to be liquefied is generally a stream of natural gas obtained from natural gas fields, oil reservoirs or a domestic gas network distributed via pipelines.

Customarily, the natural gas stream is essentially composed of methane.

Preferably, the feed stream comprises at least 80 mol % of methane. Depending on the source, the natural gas contains quantities of hydrocarbons heavier than methane, such as for example ethane, propane, butane and pentane and also certain aromatic hydrocarbons. The natural gas stream also contains non-hydrocarbon products such as $H_2O$, $N_2$, $CO_2$, $H_2S$ and other sulphur-containing compounds, mercury and others.

The feed stream containing the natural gas is therefore pretreated before being introduced into the heat exchanger. This pretreatment comprises the reduction and/or the elimination of the undesirable components such as the $CO_2$ and the $H_2S$, or other steps such as precooling and/or pressurization. Given that these measures are well known to a person skilled in the art, they are not described in further detail here.

In the process that is the subject of the present invention, it is essential to pretreat the natural gas stream in order to extract a $CO_2$-enriched stream that will itself be liquefied by means of the frigorie-producing system of the natural gas liquefaction unit.

The expression "natural gas" as used in the present application relates to any composition containing hydrocarbons including at least methane. This includes a "crude" composition (prior to any treatment or scrubbing), and also any composition that has been partially, substantially or completely treated for the reduction and/or elimination of one or more compounds, including, but without being limited thereto, sulphur, carbon dioxide, water, mercury and certain heavy and aromatic hydrocarbons.

The heat exchanger may be any heat exchanger, any unit or other arrangement suitable for allowing the passage of a certain number of streams, and thus enabling a direct or indirect heat exchange between one or more refrigerant fluid lines, and one or more feed streams.

BRIEF DESCRIPTION OF THE DRAWING

For a further understanding of the nature and objects for the present invention, reference should be made to the following detailed description, taken in conjunction with the accompanying drawing, in which like elements are given the same or analogous reference numbers and wherein:

FIG. 1 illustrates a schematic representation of embodiment of one embodiment of the present invention.

DESCRIPTION OF PREFERRED EMBODIMENTS

In FIG. 1, a natural gas feed stream 1 containing $CO_2$ is introduced into a treatment unit 2 in which said stream 1 is separated into at least two gas streams 3 and 4.

The natural gas feed stream 1 contains for example from 0.1 mol % to 5 mol % of $CO_2$.

The first stream 3 is a $CO_2$-depleted natural gas stream. The second stream 4 is a $CO_2$-enriched stream.

The treatment unit 2 is for example a chemical absorption unit, in particular an amine (of MDEA, MEA, etc. type) scrubbing unit that makes it possible to produce pure (or concentrated) $CO_2$ at low pressure (typically slightly greater than atmospheric pressure). Pure $CO_2$ is understood to mean a stream containing more than 95 mol % of $CO_2$ on a dry basis.

The $CO_2$-depleted natural gas stream 3 is introduced into the main exchanger 2' of a natural gas liquefaction unit in order to be liquefied.

The pressure of this gas stream is for example between 25 and 60 bar absolute. Typically, the gas stream 3 contains between 30 ppm by volume and 500 ppm by volume of benzene, usually less than 100 ppm by volume. The gas stream 3 is cooled by heat exchange in the heat exchanger 2' in contact with a refrigerant. The heat exchanger 2' is supplied by at least one refrigerant stream 3'. For example, this stream may be composed of a mixed refrigerant stream. The composition and the operating conditions of the mixed refrigerant are adjusted to the hydrocarbon to be liquefied.

The $CO_2$-depleted natural gas stream 3 introduced into the main exchanger 2' of a natural gas liquefaction unit is for example liquefied according to the process described in the following lines.

The natural gas stream cooled to a temperature between −20° C. and −70° C., typically between −35° C. and −40° C. at the outlet 4' of the exchanger 2' is introduced into a scrubbing column 5 in which the heavy products are separated from the natural gas. Heavy products are understood to mean hydrocarbons having more than four carbon atoms and aromatic compounds including in particular benzene.

A liquid stream 6 containing all (to within 1 ppm by volume) of the benzene from the initial gas stream 1 is discharged at the bottom 7 of the column 5.

At the top 8 of the column 5, a gas stream 9 comprising less than 1 ppm by volume of benzene is recovered in order to be introduced into a second heat exchanger 10 which may preferentially be a second section of the heat exchanger 2'.

The mixed refrigerant stream 11 recovered at the outlet of the heat exchanger 2' is introduced into a phase separator vessel 12 that produces a gas stream 13 containing the light elements of the refrigerant at the top of the vessel 12 and a liquid stream 14 containing the heavy elements of the refrigerant at the bottom of the vessel 12. These two streams 13 and 14 supply the second heat exchanger 10 (or second stage of the exchanger 2').

The gas stream 9 containing less than 1 ppm by volume of benzene introduced into the second heat exchanger 10 (or second section of the exchanger 2) is at least partially condensed. The two-phase stream 15 at the outlet of the second heat exchanger 10 (or second section of the exchanger 2') is introduced into a phase separator vessel 16 in order to produce a gas stream 17 at the top of the vessel 16 and a liquid stream 18 at the bottom of the vessel 16. The temperature is then typically between −70° C. and −75° C.

A first portion 18' of the liquid stream 18 supplies the top 8 of the scrubbing column 5. Depending on the installation of the vessel 16 relative to the column 5, a pair 19 of lift pumps may be present in order to suck up the liquid stream 18' in order to effect the reflux at the top 8 of the column 5.

It should be noted that the liquid reflux (stream 18') may not be sufficient and that in this case, it is possible to cool the vessel 16 by injecting liquid natural gas at the inlet of the two-phase vessel (line 22). This line 22 is important since it makes it possible to control the flow rate of liquid reflux in the column 5 and thus the benzene content of the product to be liquefied. As the composition and the operating conditions of the natural gas may change over the lifetime of the unit, the reflux flow rate required may thus be optimized, and also the liquefaction energy.

There are at least two variants for this solution:
Variant no. 1: In order to simplify the main exchanger, it is possible to directly "shower" the top of column 5 with liquid natural gas (stream 22) but the flow rate of liquid natural gas 22 is then greater and this option may be expensive in terms of liquefaction energy.
Variant no. 2: In order to reduce the flow rate of liquid natural gas required, it is also possible to shower the top of the separator vessel 16 and thus to purify the natural gas via two successive refluxes.

The gas stream 17 is introduced into a third heat exchanger 20 which may preferentially be a third section of the exchanger 2' in order to be cooled to a temperature below −110° C., for example between −110° C. and −115° C. The stream 21 thus cooled may be partly tapped and form a stream 22 that will be recycled by being introduced with the stream 15 into the phase separator vessel 16.

Indeed, according to one particular embodiment of the process for liquefying natural gas 1 that is the subject of the invention, the liquid refrigerants 14 are drawn off then, subsequently, expanded, for example with the aid of valves 23, before being reintroduced and re-vaporized in the exchange line 24 opposite the natural gas 17 being liquefied.

Thus, a stream of liquid natural gas may be tapped 22 at this level (colder than the phase separator vessel 16 forming the reflux of the column 5) and recycled to the vessel 16 in order to increase the reflux liquid 18' in the event of lack of the latter, while limiting the loss of effectiveness by instantaneous vaporization.

Finally, the gas stream 21 is introduced into a heat exchanger 26 in order to produce a stream of liquefied natural gas 27, a product purified from heavy compounds and from aromatics, including typically benzene, resulting from the liquefaction and purification process that is the subject of the present invention.

The second $CO_2$-enriched gas stream 4 resulting from the treatment unit 2 is liquefied in a $CO_2$ purification/liquefaction unit 28 by heat exchange with a second portion 18" of the liquid stream 18 resulting from the bottom of the separator vessel 16, used as refrigerant fluid.

The purification/liquefaction unit 28 typically comprises compression means, purification means and liquefaction means, for example a distillation column provided with a condensation means supplied with refrigerant fluid.

Thus, the second $CO_2$-enriched gas stream 4 resulting from the treatment unit 2 is compressed to medium pressure (typically 25 bar abs), cooled, purified (elimination of $H_2O$, heavy hydrocarbons, sulphur derivatives in particular) then sent back to a distillation column that separates the noncondensable gases at the top from the pure liquid $CO_2$ 29 recovered at the bottom.

In order to provide the refrigeration necessary for the correct operation of the $CO_2$ purification/liquefaction unit 28, the refrigerant fluid (i.e. here the liquid stream 18") circulates between the $CO_2$ purification/liquefaction unit 28 and the natural gas liquefaction unit. Thus, owing to this thermal integration, a refrigeration cycle dedicated to the $CO_2$ purification/liquefaction unit is avoided.

A stream 29 comprising more than 95 mol % of liquefied $CO_2$, preferably more than 99 mol %, is extracted from this unit 28 and will be able to be used for various applications, for example in the food sector. Preferably, the stream 29 contains more than 99.5 mol % of $CO_2$.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for producing liquefied natural gas and liquid carbon dioxide ($CO_2$) from a natural gas feed gas further comprising carbon dioxide and at least 10 ppm by mole of hydrocarbons having at least six carbon atoms, the process comprising at least the following steps:

Step a): separating the natural gas feed gas in a treatment unit, into a $CO_2$-enriched gas stream and a natural gas stream;

Step b): cooling said natural gas stream to a temperature between −20° C. and −60° C. by heat exchange with at least one refrigerant in a first heat exchanger;

Step c): purifying the natural gas stream from hydrocarbons having at least six carbon atoms in a scrubbing column, wherein at a top portion of the scrubbing column, a top gas stream containing less than 5 ppm by volume of hydrocarbons having at least six carbon atoms is withdrawn, and, at a bottom portion of the scrubbing column, a bottom liquid stream enriched in hydrocarbons having at least five carbon atoms is withdrawn;

Step d): at least partially condensing said top gas stream resulting from step c) in a second heat exchanger in order to form an at least partially condensed top gas stream;

Step e): separating said at least partially condensed top gas stream resulting from step d) in a phase separator vessel at a temperature between −60° C. and −80° C. in order to form a gas stream at the top of the vessel and a liquid stream at the bottom of the vessel;

Step f): introducing a first portion of the liquid stream resulting from step e) at the top portion of the scrubbing column in order to effect reflux at the top portion of the scrubbing column;

Step g): condensing the gas stream resulting from step e) by heat exchange in a third heat exchanger at a temperature below −100° C. in order to form a liquefied gas containing less than 5 ppm by volume of hydrocarbons having at least six carbon atoms;

Step h): liquefying the $CO_2$-enriched gas stream resulting from step a) by heat exchange with a second portion of the liquid stream resulting from step e).

2. The process of claim 1, wherein the feed gas comprises from 0.1 mol % to 5 mol % of $CO_2$.

3. The process of claim 1, wherein the top gas stream resulting from step c) and the liquefied natural gas resulting from step d) contain less than 1 ppm by mole of hydrocarbons having at least six carbon atoms.

4. The process of claim 1, wherein the $CO_2$-enriched gas stream resulting from step a) comprises at least 95 mol % of $CO_2$.

5. The process of claim 1, wherein said treatment unit used in step a) is an amine scrubbing unit.

6. The process of claim 1, wherein said hydrocarbons having at least six carbon atoms comprise a majority of benzene.

7. The process of claim 1, wherein the natural gas stream is cooled in step b) to a temperature that is between −20° C. and −40° C.

8. The process of claim 1, wherein the second portion of the liquid stream resulting from step e), having been used to liquefy the $CO_2$-enriched stream during step g), is then reinjected into the bottom of the scrubbing column.

9. The process of claim 1, wherein the second heat exchanger is separate from the first heat exchanger or is a second section of the first heat exchanger.

10. The process of claim 1, wherein the third heat exchanger is separate from the first heat exchanger or is a third section of the first heat exchanger.

* * * * *